(12) United States Patent
Bergman et al.

(10) Patent No.: US 9,119,122 B2
(45) Date of Patent: Aug. 25, 2015

(54) APPARATUS, METHOD, AND COMPUTER PROGRAM PRODUCT FOR ADJUSTING HANDOVER PARAMETERS

(75) Inventors: Petter Bergman, Ljungsbro (SE); Peter Werner, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 89 days.

(21) Appl. No.: 14/008,778

(22) PCT Filed: Apr. 12, 2011

(86) PCT No.: PCT/SE2011/050447
§ 371 (c)(1),
(2), (4) Date: Sep. 30, 2013

(87) PCT Pub. No.: WO2012/141627
PCT Pub. Date: Oct. 18, 2012

(65) Prior Publication Data
US 2014/0024374 A1    Jan. 23, 2014

(51) Int. Cl.
*H04W 24/00* (2009.01)
*H04W 36/00* (2009.01)
*H04W 36/08* (2009.01)
*H04W 92/20* (2009.01)

(52) U.S. Cl.
CPC .......... *H04W 36/0083* (2013.01); *H04W 36/08* (2013.01); *H04W 92/20* (2013.01)

(58) Field of Classification Search
USPC ............... 455/403, 422.1, 423, 436; 370/252
See application file for complete search history.

(56) References Cited

U.S. PATENT DOCUMENTS

2008/0064361 A1* 3/2008 Bjork et al. .................. 455/403
2010/0124918 A1* 5/2010 Agashe et al. ................ 455/423
2010/0195525 A1* 8/2010 Eerolainen .................... 370/252
2011/0201339 A1* 8/2011 Kuningas ..................... 455/436
2011/0263282 A1* 10/2011 Rune et al. .................... 455/507
2012/0252440 A1* 10/2012 Watanabe ..................... 455/423
2013/0142064 A1* 6/2013 Dinan ........................... 370/252
2014/0024374 A1* 1/2014 Bergman et al. .............. 455/436

FOREIGN PATENT DOCUMENTS

WO        2010057123 A2    5/2010

OTHER PUBLICATIONS

Huawei, "Solutions for the Mobility Robustness use case", 3GPP TSG RAN WG3 Meeting #60, Kansas City, USA, May 5, 2008, pp. 1-6, R3-081165, 3rd Generation Partnership Project.
RAN3 (Motorola et al), "Introduction of MRO procedures in stage 2", 3GPP TSG-RAN WG2 Meeting #68, Jeju, Korea, Nov. 9, 2009, pp. 1-6, 36.300 Change Request 0179, R2-097533, 3rd Generation Partnership Project.
Nokia Siemens Networks, "Planned RAN Work Item on Self-Organizing Networks", 3GPP TSG RAN WG3 & TSG SA WG5 Joint Meeting, Sophia Antipolis, France, Jan. 12, 2009, pp. 1-4, S5-090029, 3rd Generation Partnership Project.
3rd Generation Partnership Project, Technical Specification Group Radio Access Network, Evolved Universal Terrestrial Radio Access Network (E-UTRAN), X2 application protocol (X2AP), Dec. 2010, 3GPP TS 36.423 V9.5.0 (Release 9).

* cited by examiner

*Primary Examiner* — Nathan Taylor
(74) *Attorney, Agent, or Firm* — Coats & Bennett, PLLC

(57) ABSTRACT

It is presented a method for adjusting handover parameters of a processed base station in relation to neighboring base stations, neighboring the processed base station. The method being executed in a handover parameter determiner and comprises: obtaining (20) a list of neighboring base stations of the mobile communication network; determining (22), for each of the neighboring base stations in the list, a capability to send handover issue report messages; and adjusting (24) the handover parameters based on the determined capabilities for each of the neighboring base stations in the list.

20 Claims, 3 Drawing Sheets

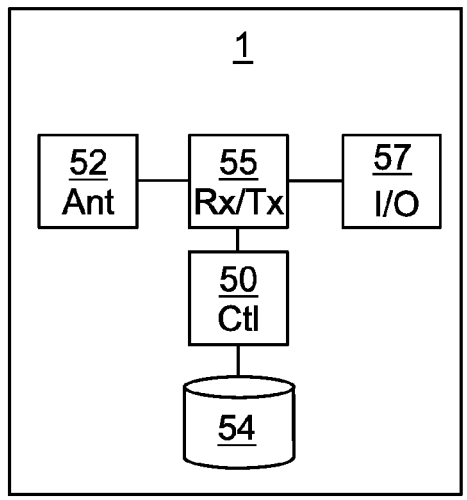
Fig. 5
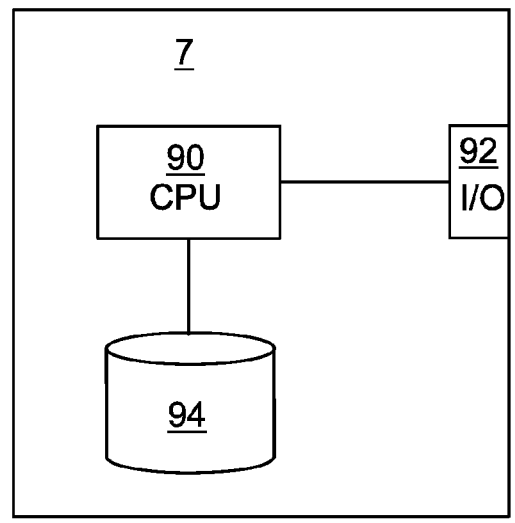
Fig. 6
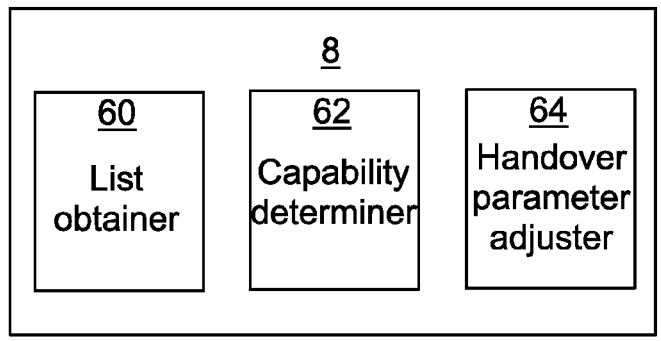
Fig. 7
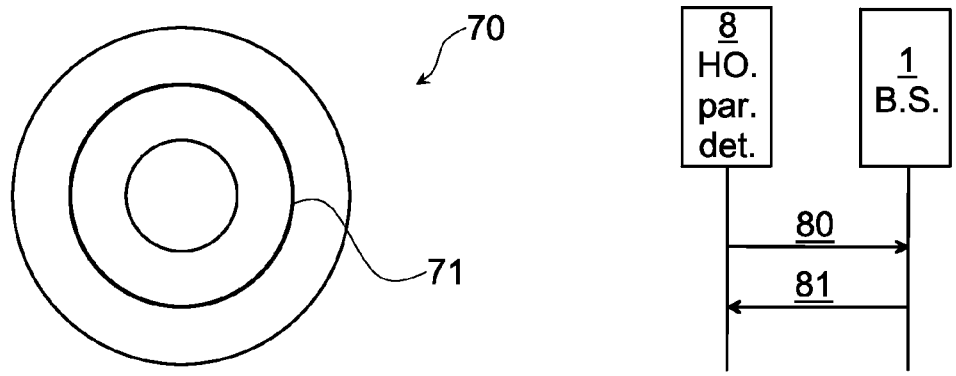
Fig. 8
Fig. 9

APPARATUS, METHOD, AND COMPUTER PROGRAM PRODUCT FOR ADJUSTING HANDOVER PARAMETERS

TECHNICAL FIELD

The invention relates to a handover determiner and more particularly to a handover determiner for adjusting handover parameter of a base station.

BACKGROUND

When a mobile communication terminal moves geographically between cells of different base stations, the connection with the mobile communication terminal is transferred between the base stations. This is known as handover and has been implemented in most mobile communication networks.

Whether to perform a handover often depends on signal levels of two base stations as measured by the mobile communication terminal. However, handover problems do sometimes occur when handing over from a source base station to a target base station, e.g. by the mobile communication terminal losing the radio link to the target base station or establishing a connection with a third base station. Knowledge of such events assists in controlling whether a handover is to be triggered or not.

However, in heterogeneous environments with base stations of different configurations, the various types of base stations handle these events differently which can easily create a chaotic situation where different base stations handle the handover issues differently. This can lead to incorrect conclusions when expected handover issue messages are not received, either due to the issue not occurring or the base station not having the capability to send such handover issue messages.

SUMMARY

An object of the invention is to improve handover determination, especially in a heterogeneous environment with respect to base station configurations.

A first aspect is a handover parameter determiner for adjusting handover parameters of a processed base station in relation to neighboring base stations, neighboring the processed base station. The handover parameter determiner comprises: a list obtainer arranged to obtain, for a particular base station, a list of neighboring base stations; a capability determiner arranged to determine, for each of the neighboring base stations in the list, a capability to send handover issue report messages; and a handover parameter adjuster arranged to adjust the handover parameters based on the determined capabilities for each of the neighboring base stations in the list.

By using the knowledge of the capabilities of the neighboring base station to send handover issue report messages, the handover parameters can be calculated with better precision. This is due to the reason that an absence of a particular handover issue report message should be interpreted differently if it is due to no issues, compared to if it is due to a lack of ability to send such a message. This supports a heterogeneous environment where there are base stations of different types. The capabilities can be collected separately for each type of handover issue report message.

The handover parameter adjuster may be arranged to consider an absence of handover issue report messages from a neighboring base station differently depending on whether the neighboring base station is determined to be capable to send handover issue report messages.

A second aspect is a base station comprising a handover parameter determiner according to the first aspect, wherein the base station is the processed base station of the handover parameter determiner. In this way, each base station is capable of determining handover parameters using information of the capabilities of its neighboring base stations.

A third aspect is a server comprising a handover parameter determiner according to the first aspect, wherein the handover parameter determiner is arranged to adjust handover parameters for a plurality of respective processed base stations of a mobile communication network. This provides a server which can be used to determine handover parameters for each base station, in relation to its respective neighbors.

A fourth aspect is a method for adjusting handover parameters of a processed base station in relation to neighboring base stations, neighboring the processed base station. The method being executed in a handover parameter determiner and comprises: obtaining a list of neighboring base stations of the mobile communication network; determining, for each of the neighboring base stations in the list, a capability to send handover issue report messages; and adjusting the handover parameters based on the determined capabilities for each of the neighboring base stations in the list.

The step of adjusting the handover parameters may involve considering an absence of handover issue report messages from a neighboring base station differently depending on whether the neighboring base station is determined to be capable to send handover issue report messages.

The handover issue report messages may include radio link failure indication messages, indicating that a mobile communication terminal has lost connection to a base station and subsequently reconnected to another base station. The radio link failure indication message can be a message in accordance with the LTE standard.

The handover issue report messages may include handover report messages, indicating a failed handover. The handover report message can be a message in accordance with the LTE standard.

The step of adjusting handover parameters may comprise considering an absence of handover issue report messages after a handover differently based on the capabilities of the involved neighboring base station.

The step of determining may comprise initially considering each of the neighboring base stations in the list to be incapable of sending handover issue report messages, and when a handover issue report message is received from a reporting base station, determining the reporting base station to be capable of sending handover issue report messages. This is a convenient way to automatically maintain a list of capabilities without explicitly requesting capabilities.

The step of determining may comprise, for each of the neighboring base stations in the list: sending a capability request to the base station in question, requesting the base station in question to send a capability response comprising indication of a capability to send handover issue report message.

The step of determining may comprise: determining the capabilities of a base station in question by receiving a capability response message and reading the content of the capability response message.

The capability request may be comprised in an X2 SETUP REQUEST message in compliance with 3GPP TS 36.423 V9.2.0 or later and capability response may be comprised in an X2 SETUP RESPONSE message in compliance with 3GPP TS 36.423 V9.2.0 or later.

The list of neighboring base stations may comprise all the neighboring base stations.

The step of adjusting may comprise adjusting a handover margin, indicating how much better a signal from a target base station should be compared to a currently connected base station for a mobile communication terminal to commence handover.

The step of adjusting may comprise adjusting a time to trigger parameter, indicating for how long a signal from a target base station should be better than a connected base station for a mobile communication terminal to commence handover.

A fifth aspect is a computer program for adjusting handover parameters of a processed base station in relation to neighboring base stations, neighboring the processed base station. The computer program comprises computer program code which, when run on a handover parameter determiner, causes the handover parameter determiner to: obtain a list of neighboring base stations of the mobile communication network; determine, for each of the neighboring base stations in the list, a capability to send handover issue report messages; and adjust the handover parameters based on the determined capabilities for each of the neighboring base stations in the list.

A sixth aspect is a computer program product comprising a computer program according to the fifth aspect and a computer readable means on which the computer program is stored.

It is to be noted that any feature of the first, second, third, fourth, fifth and sixth aspects may, where appropriate, be applied to any other of these aspects.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a schematic diagram showing some components of the base station of FIG. 1;

FIG. 6 is a schematic diagram showing some components of the server of FIG. 1;

FIG. 7 is a schematic diagram showing functional modules of the handover parameter determiner of FIGS. 2A-B;

FIG. 8 shows one example of a computer program product comprising computer readable means; and FIG. 9 is a flow chart illustrating a capability query between a handover determiner and a base station.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
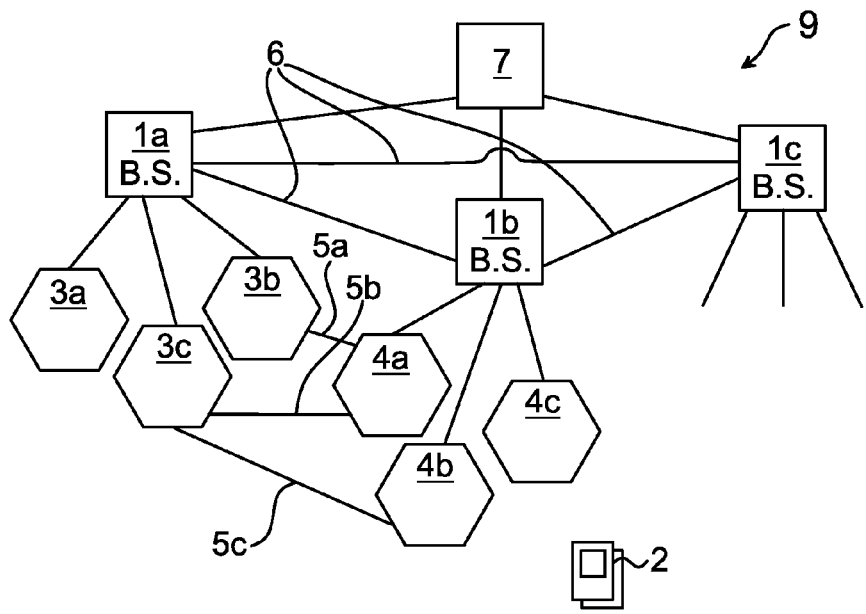
FIG. 1 is a schematic diagram illustrating an environment where embodiments presented herein can be applied.

FIG. 1 is a schematic diagram illustrating an environment where embodiments presented herein can be applied. In a mobile communication network 9 there are three base stations 1a-1c shown. The mobile communication network 9 can comply with Long Term Evolution, LTE, standard of 3rd Generation Partnership Project, 3GPP or any other applicable standard such as W-CDMA (Wideband Code Division Multiple Access), GSM (Wideband Code Division Multiple Access), etc. Hereinafter, references are on occasion made to messages according to LTE for completeness sake, but it is to be noted that this does not restrict the embodiments, which can be applied to any suitable standard.

The base stations can be extended node Bs (eNBs) in an LTE system or equivalent nodes in other types of systems. While three base stations are shown here, the mobile communication network 9 can comprise any number of suitable base stations. A first base station 1a is responsible for three cells 3a-3c and a second base station 1b is responsible for three cells 4a-c. A third base station 1c is also responsible for three cells (not shown). While the number of cells of each base station here is illustrated as being three, it is to be noted that the number of cells of each base station can be any suitable number including one, two or more than three. The base stations 1a-c have a communication channel 6 between them. The communication link can for example be an X2 link in accordance with the LTE standards, using X2AP (X2 application protocol). A server 7 can be provided being in contact with each one of the base stations 1a-c.

The cell 4a of the second base station 1b has a reciprocal neighbor relationship 5a, 5b respectively with cells 3b, 3c of the first base station 1a. Moreover, the cell 4b of the second base station 1b has a reciprocal neighbor relationship 5c with the cell 3c of the first base station 1a. This implies that the first base station 1a and the second base station 1b are neighboring base stations. It is sufficient that there is single neighbor relationship between the cells of two base stations for the base stations to be considered neighboring base stations.

It is to be noted that the cells are here shown spaced apart slightly for illustrational purposes. In reality, the cells can border each other properly or overlap.

One or more mobile communication terminals 2 are shown, where each mobile communication terminal 2 is mobile between the cells of the base stations of the mobile communication network 9 to achieve connectivity with the mobile communication network 9.

When a mobile communication terminal 2 moves geographically, the connection with the mobile communication terminal is transferred between cells, typically between neighboring cells. When the transfer occurs between two base stations, it is called a handover. Since, in practice, there is often an overlap between cells, there is a zone where the handover can be performed.

For each base station 1a-c, there are several handover parameters that are set to reduce the risk of handover issues such as too early handover or too late handover. The handover parameters apply for each neighboring base station and can differ within the same base station with respect to different neighboring base stations.

One handover parameter is "handover margin", which indicates by how much (e.g. in decibels), a signal for a new base station needs to be better for the handover to occur. The signal measurement can e.g. be signal strength or signal to noise ratio. The handover margin should not be too low, as this can create an effect of oscillating handovers back and forth between two base stations due to temporary variations in radio conditions. At the same time, the handover margin should not be too high, as this could result in a dropped connection.

Another handover parameter is time to trigger, which indicates for how long the signal to noise ratio of the new base station needs to be better than the handover margin for the handover to occur. The measurements of signal to noise ratio are performed in the mobile communication terminal 2. The time to trigger should not be too short, as this could also create an effect of oscillating handovers back and forth between two base stations due to temporary variations in radio conditions. At the same time, the time to trigger should not be too long, as this could also result in a dropped connection.

The handover parameters are set, at least partly, in a handover parameter determiner based on statistics collected from handover issue report messages indicating failed handovers or handovers to wrong base stations. The handover issue report messages can include radio link failure indication messages and/or handover report messages, which will be explained in more detail with reference to FIGS. 3A and 3B below.

Figure 2A:
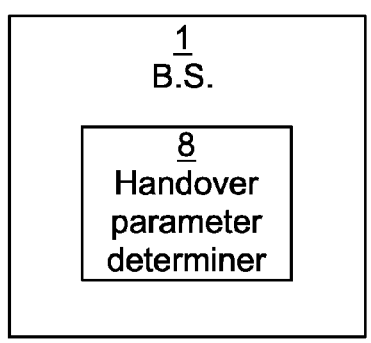
FIGS. 2A-B are schematic diagrams illustrating that the handover parameter determiner can be implemented in a base station or server of FIG. 1.
Figure 2B:
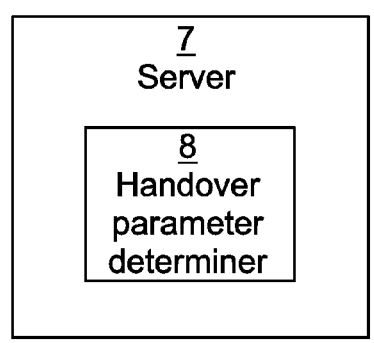

FIGS. 2A-B are schematic diagrams illustrating that the handover parameter determiner 8 can be implemented in a base station or server of FIG. 1. The handover parameter determiner 8 is a functional module. The module can be implemented using hardware and/or software such as a computer program executing in the base station 2 or the server 7. In FIG. 2A, the handover parameter determiner 8 is shown as being part of a base station 1 and in FIG. 2B, the handover parameter determiner 8 is shown as being part of the server 7. By being include in the server 7, the handover parameter determiner 8 can be used to determine handover parameters for several or all base stations of the mobile communication network 9.

Figure 3A:
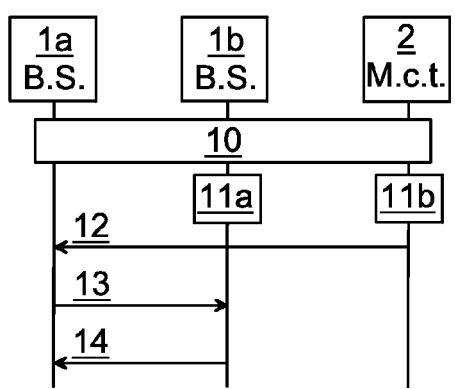
FIGS. 3A-B are sequence diagrams illustrating handover issue report messages between base stations of FIG. 1.
Figure 3B:
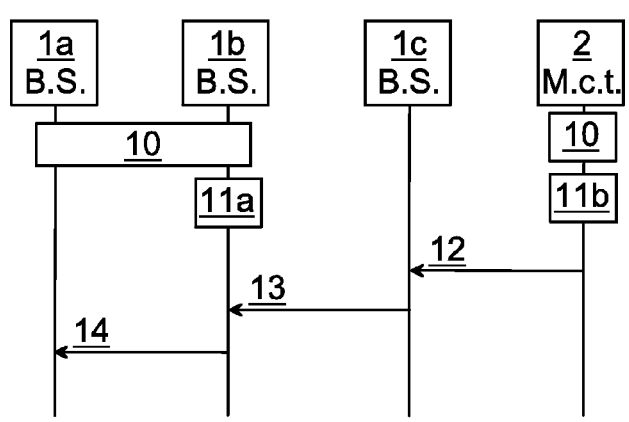

FIGS. 3A-B are sequence diagrams illustrating handover issue report messages between base stations of FIG. 1. References here will also be made to FIGS. 1 and 2A-B.

In FIG. 3A, a handover has previously been determined to be effected. The handover 10 is performed to transfer the mobile communication terminal 2 from the first base station 1a to the second base station 1b. However, for some reason, the mobile communication terminal 2 loses 11a-b the connection to the second base station 1b.

The mobile communication terminal 2 subsequently establishes 12 a connection with the first base station 1a. During this, the mobile communication terminal 2 informs the first base station 1a that the mobile communication terminal 2 comes from a failed link with the second base station 1b. As a result of this, the first base station 1a sends a radio link failure message 13 to the second base station 1b. The radio link failure message 13 is a message to indicate that a mobile communication terminal has lost connection to a base station and subsequently reconnected to another base station. The second base station 1b responds to the first base station 1a with a handover report message 14. The handover report message 14 indicates the failed handover.

The situation of FIG. 3B is similar to the situation of FIG. 3A with the difference being that there are three base stations involved.

As before, a handover has previously been determined to be effected. This handover 10 is performed to transfer the mobile communication terminal 2 from the first base station 1a to the second base station 1b. Again, the mobile communication terminal 2 loses 11a-b the connection to the second base station 1b.

Here however, the mobile communication terminal 2 subsequently establishes 12 a connection with the third base station 1c. During this, the mobile communication terminal 2 informs the third base station 1c that the mobile communication terminal 2 comes from a failed link with the second base station 1b. It is therefore here the third base station 1c that sends the radio link failure message 13 to the second base station 1b. The second base station 1b then informs the original base station, being the first base station 1a of the failed handover using the handover report message 14.

By collecting these handover issue report messages (the radio link failure message 13 and the handover report message 14) over time, the first base station 1a can thus adjust the handover parameters to avoid handover failures in the future, as will be explained in more detail below.

One problem occurs when some base stations support these handover issue report messages and some do not. Lacking radio link failure messages from one base station could have two potential causes. The first cause is that no mobile communication terminal tries to re-establish connection in any of the cells of the base station. The second cause is that the base station does not support the sending of this message.

These different causes can require different actions in the determination of handover parameters. For example: Without any radio link failure message, no "too late handover" events will be detected. This indicates that the handover margin could be increased for the corresponding relation. But if the radio link failure message is not supported, a number of "too late HO" events could have taken place without the knowledge thereof, whereby the handover margin in this case should not be decreased.

Analogously, lacking handover report messages from one base station could either be caused by the absence of "too early handover" or "handover to wrong cell" events occurring in the cells of the base station, or by the situation that the base station does not support sending of this message. Again, these cases should be treated differently when determining handover parameters.

Thus, without the knowledge of if a neighbor base station supports the handover issue report messages, the handover parameter determination will not work properly.

Figure 4A:
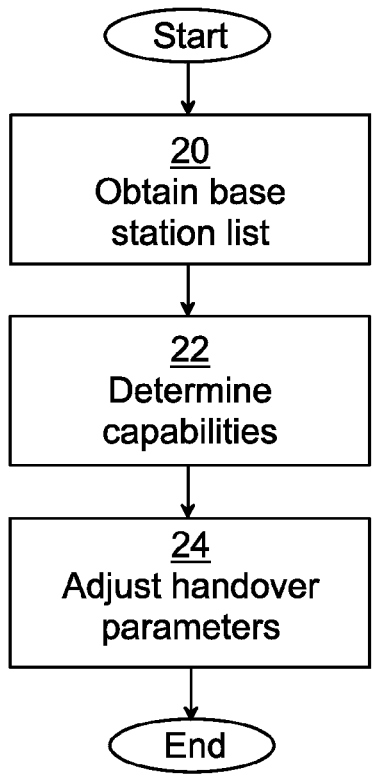
FIGS. 4A-C are flow charts illustrating methods performed in the handover parameter determiner of FIGS. 2A-B.
Figure 4B:
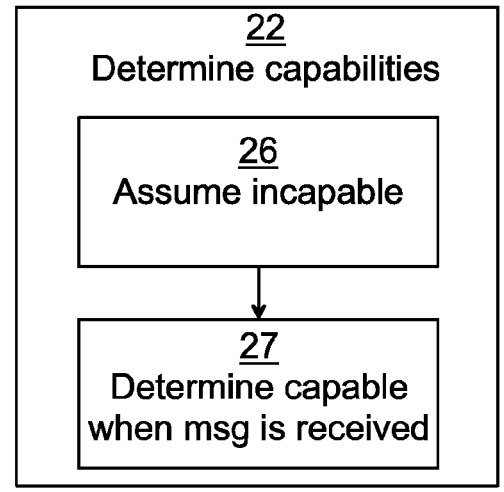
Figure 4C:
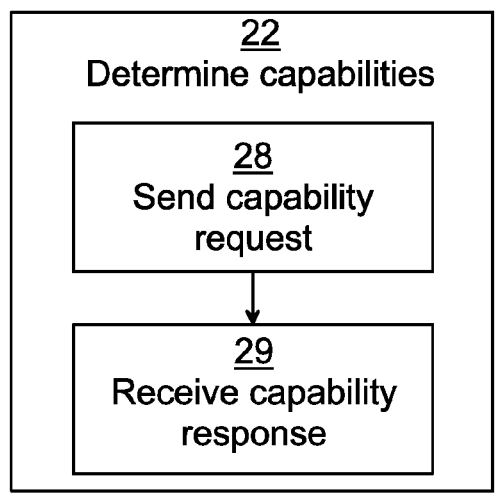

FIGS. 4A-C are flow charts illustrating methods performed in the handover parameter determiner of FIGS. 2A-B.

In an initial obtain base station list step 20, a list of neighboring base stations of the mobile communication network is obtained.

In a determine capabilities step 22, the handover parameter determiner determines, for each of the neighboring base stations in the list, whether it is capable of sending handover issue report messages. Optionally, a record is kept of which types of messages are supported, such as radio link failure and handover report.

In an adjust handover parameter step 24, the handover parameters are adjusted based on the determined capabilities for each of the neighboring base stations in the list.

Statistics per relation is collected by the base station. Counters for handover too early, handover too late and handover to the wrong cell are collected. When handover to the wrong cell happens, statistics are only affected for cases where the intended cell (the right cell) is also a neighbor to the source cell, are the statistics affected. For handovers to the wrong cell, event counters for both the actual cell (the cell with which communication ended up being established with) and the intended cell (the intended handover cell) shall be collected.

This step can compare the measured rate with the target rate for the following five events: handover oscillation, handover too early, handover too late, handover to wrong cell (actual cell), and handover to wrong cell (intended cell). These events are counted per relation, i.e. neighboring base station.

Each event counter can be compared with a configurable target rate. The difference (the error) is multiplied with a configurable weight. The resulting values for all events are accumulated into a relation level handover inhibition factor. In this accumulation, the resulting values for too late handover and handover to wrong cell (intended cell) are negated prior to accumulation.

This relation level handover inhibition factor represents a desired increase or, if negative, decrease of handover margin and time to trigger parameters that is needed to balance the statistics.

The handover margin parameter can be adjusted to ensure it complies with allowed values and/or relative adjustment, e.g. in whole or half dB steps. Likewise, the time to trigger parameter can be kept within allowed values and/or relative adjustments.

While the steps are here shown sequentially, determine capabilities step 22 and the adjust handover parameters step 24 can be performed in parallel and can be repeated at certain intervals or occur as new information becomes available.

FIG. 4B shows sub-steps of the determine capabilities step 22 according to one embodiment. In an assume incapable step 26, it is here assumed initially that every neighboring base station does not have the capability of sending the handover issue report messages.

Subsequently, in a determine capable when message is received step 27, when a handover issue report message is received from a neighboring base station, such a base station is clearly able to send such messages and the capability of that base station is updated accordingly. This can be performed independently for the capability to send radio link failure messages and handover report messages.

Also here, while the steps are shown sequentially, the assume incapable step can be performed initially, and the determine capable when message is received step 27 is performed when any such handover issue report message is received from a neighboring base station.

FIG. 4C shows sub-steps of the determine capabilities step 22 according to one embodiment. In a send capability request step 28, the base station being active to maintain its capability list of neighboring base stations sends a capability request to each one of the neighboring base stations. Optionally, the capability request can be included as an addition to an X2 SETUP REQUEST message in compliance with 3GPP TS 36.423 V9.2.0 or later, thereby using an existing communication protocol to great extent.

In a receive capability response step 29, the base station being active to maintain its capability list receives a capability response from a subset or all of the neighboring bases stations. The capability of each base station is updated accordingly. Optionally, the capability response can be included in an X2 SETUP RESPONSE message in compliance with 3GPP TS 36.423 V9.2.0 or later. The capability response message can include two flags, indicating the capability to send radio link failure messages and handover report messages, respectively.

The embodiments illustrated in FIGS. 4B and 4C can be combined by, in FIG. 4C, adding the determine capable when message is received step 27, after the receive capability response step. In this way, if a capability response message is not received from a particular neighboring base station, that base station is assumed to not have any capability to send handover issue report messages. However, but this is adjusted if a handover issue report message is later received from that neighboring base station.

FIG. 5 is a schematic diagram showing some components of a base station 1 such as any one of the base stations 1a-c of FIG. 1. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, or solid state memory or even remotely mounted memory.

The base station 1 also comprises an I/O interface 57 for communicating with other elements of the mobile communication network such as other base stations or the server 7.

The base station 1 also comprises one or more transceivers 55 and a corresponding number of antennas 52 for radio communication with mobile communication terminals.

FIG. 6 is a schematic diagram showing some components of the server 7 of FIG. 1. A controller 90 is provided using any suitable central processing unit (CPU), microcontroller, digital signal processor (DSP), capable of executing software instructions stored in a computer program product 94, e.g. in the form of a memory. The computer program product 94 can be a memory or any combination of read and write memory (RAM) and read only memory (ROM). The memory also comprises persistent storage, which, for example, can be any single one or combination of magnetic memory, optical memory, or solid state memory or even remotely mounted memory.

The server 7 also comprises an I/O interface 92 for communicating with other elements of the mobile communication network such as the base stations.

FIG. 7 is a schematic diagram showing functional modules of the handover parameter determiner of FIGS. 2A-B. The modules can be implemented using hardware and/or software such as a computer program executing in the base station 2 or the server 7. All modules depend on an execution environment (not shown) which utilizes the components shown in FIGS. 5 and 6 respectively. The modules correspond to steps of the method illustrated in FIGS. 4A-C.

A list obtainer 60 is arranged to obtain, for a particular processed base station, a list of neighboring base stations. This module performs step 20 of FIG. 4A.

A capability determiner 62 is arranged to determine, for each of the neighboring base stations in the list, a capability to send handover issue report messages. This module corresponds to step 22 of FIG. 4A, and thus optionally also the sub-steps shown in either or both of FIGS. 4B-C.

A handover parameter adjuster 64 is arranged to adjust the handover parameters based on the determined capabilities for each of the neighboring base stations in the list.

FIG. 8 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 54 of the base station 2 or memory 94 of the server 7. While the computer program 71 is here schematically shown as a track on the depicted optical disk, the computer program can be stored in any way which is suitable for the computer program product.

FIG. 9 is a sequence diagram illustrating a capability query between a handover determiner 8 and a base station 1b. This corresponds to the sub-steps of FIG. 4C.

First, the handover parameter determiner 8 sends a capability request 80 to the base station. This corresponds to sub-step 28 of FIG. 4C.

Secondly, the base station 1 sends a capability response 81 to the handover parameter determiner 8. This corresponds to sub-step 29 of FIG. 4C.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for adjusting handover parameters of a processed base station in relation to neighboring base stations in a mobile communication network, the neighboring base stations each neighboring the processed base station, the method being executed in a handover parameter determiner that comprises one or more circuits, the method comprising:
    obtaining a list of neighboring base stations of the mobile communication network;
    determining, for each of the neighboring base stations in the list, whether the neighboring base station is capable of sending a handover issue report message over any interface to report an issue with an attempted and/or successful handover;
    adjusting handover parameters of the processed base station based on the determined capabilities for each of the neighboring base stations in the list.

2. The method of claim 1, wherein the adjusting handover parameters comprises considering an absence of handover issue report messages from a neighboring base station differently depending on whether the neighboring base station is determined to be capable to send handover issue report messages.

3. The method of claim 1, wherein the handover issue report message includes a radio link failure indication message, indicating that a mobile communication terminal has lost connection to a base station and subsequently reconnected to another base station.

4. The method of claim 1, wherein the handover issue report message includes a handover report message indicating a failed handover.

5. The method of claim 1, wherein the adjusting handover parameters comprises considering an absence of handover issue report messages after a handover differently based on the capabilities of the involved neighboring base station.

6. The method of claim 1:
    wherein the determining comprises initially considering each of the neighboring base stations in the list to be incapable of sending handover issue report messages; and
    thereafter, in response to a handover issue report message being received from a reporting neighboring base station, determining that the reporting neighboring base station is capable of sending a handover issue report message.

7. The method of claim 1, wherein the determining comprises sending a capability request to each of the neighboring base stations in the list, the capability request requesting the neighboring base station to send a capability response comprising indication of a capability to send a handover issue report message.

8. The method of claim 7, wherein the determining comprises: determining the capabilities of a neighboring base station by receiving a capability response message and reading the content of the capability response message.

9. The method of claim 8, wherein the capability request is comprised in an X2 SETUP REQUEST message, wherein the capability response is comprised in an X2 SETUP RESPONSE message.

10. The method of claim 1, wherein the list of neighboring base stations comprises all the base stations neighboring the processed base station.

11. The method of claim 1, wherein the adjusting comprises adjusting a handover margin, indicating how much better a signal from a target base station should be compared to a currently connected base station for a mobile communication terminal to commence handover.

12. The method of claim 1, wherein the adjusting comprises adjusting a time to trigger parameter, indicating for how long a signal from a target base station should be better than a connected base station for a mobile communication terminal to commence handover.

13. The method of claim 1, wherein said determining is based on information received by the handover parameter determiner circuit from each of the neighboring base stations in the list.

14. The method of claim 1, wherein said determining further comprises determining, for each of a plurality of handover issue report message types, whether the neighboring base station is capable of sending that type of handover issue report message.

15. The method of claim 1, wherein said one or more circuits comprise a processor and a memory, said memory containing instructions executable by said processor.

16. A handover parameter determiner for adjusting handover parameters of a processed base station in relation to neighboring base stations in a mobile communication network, the neighboring base stations each neighboring the processed base station, the handover parameter determiner comprising:
    one or more circuits configured to:
        obtain, for a particular base station, a list of neighboring base stations of the mobile communication network;
        determine, for each of the neighboring base stations in the list, whether the neighboring base station is capable of sending a handover issue report message over any interface to report an issue with an attempted and/or successful handover;
        adjust the handover parameters based on the determined capabilities for each of the neighboring base stations in the list.

17. The handover parameter determiner of claim 16, wherein the handover parameter determiner comprises a portion of a first base station, the first base station being the processed base station.

18. The handover parameter determiner of claim 16:
    wherein the handover parameter determiner comprises a portion of a server in the mobile communications network;

wherein the handover parameter determiner is configured to adjust handover parameters for a plurality of respective processed base stations of a mobile communication network.

19. The handover parameter determiner of claim 16, wherein the one or more circuits comprise a memory and a processor, said memory containing instructions executable by said processor.

20. A computer program product stored in a non-transitory computer readable medium for adjusting handover parameters of a processed base station in relation to neighboring base stations in a mobile communication network, the computer program product comprising software instructions which, when run on one or more processing circuits, causes the one or more processing circuits to:
   obtain a list of neighboring base stations of the mobile communication network;
   determine, for each of the neighboring base stations in the list, whether the neighboring base station is capable of sending a handover issue report message over any interface to report an issue with an attempted and/or successful handover;
   adjust the handover parameters based on the determined capabilities for each of the neighboring base stations in the list.

* * * * *

UNITED STATES PATENT AND TRADEMARK OFFICE
CERTIFICATE OF CORRECTION

PATENT NO. : 9,119,122 B2  Page 1 of 1
APPLICATION NO. : 14/008778
DATED : August 25, 2015
INVENTOR(S) : Bergman et al.

It is certified that error appears in the above-identified patent and that said Letters Patent is hereby corrected as shown below:

In the Specification:

In Column 4, Lines 16-17, delete "(Wideband Code Division Multiple Access)," and insert -- (Global System for Mobile communication), --, therefor.

In Column 5, Line 35, delete "base station 2" and insert -- base station 1 --, therefor.

In Column 8, Line 47, delete "base station 2" and insert -- base station 1 --, therefor.

In Column 9, Line 5, delete "base station 2" and insert -- base station 1 --, therefor.

Signed and Sealed this
Twenty-third Day of August, 2016

Michelle K. Lee
*Director of the United States Patent and Trademark Office*